United States Patent [19]

Ohmi

[11] 4,173,172
[45] Nov. 6, 1979

[54] TANDEM BRAKE BOOSTER

[75] Inventor: Atsushi Ohmi, Anjo, Japan

[73] Assignee: Aisin Seiki Kabushiki Kaisha, Aichi, Japan

[21] Appl. No.: 886,459

[22] Filed: Mar. 14, 1978

[30] Foreign Application Priority Data

Mar. 19, 1977 [JP] Japan .......................... 52/33734[U]

[51] Int. Cl.² .......................... F15B 9/10; F01B 19/00
[52] U.S. Cl. .......................... 91/369 A; 92/48
[58] Field of Search .................. 92/48, 49; 91/369 A, 91/369 B, 369 R

[56] References Cited

U.S. PATENT DOCUMENTS

| 3,096,689 | 7/1963 | Kytta ........................... 92/48 |
| 3,289,547 | 12/1966 | Kytta ........................... 92/48 |
| 3,385,167 | 5/1968 | Wilson et al. ................. 92/48 |
| 3,603,208 | 9/1971 | Kytta ........................... 92/48 |
| 3,688,647 | 9/1972 | Kytta ........................ 91/369 A |
| 4,069,742 | 1/1978 | Gephart et al. ............ 91/369 A |

*Primary Examiner*—Paul E. Maslousky
*Attorney, Agent, or Firm*—Oblon, Fisher, Spivak, McClelland & Maier

[57] ABSTRACT

A tandem diaphragm brake booster includes a pair of diaphragm pistons which are axially movable for assisting brake efforts through manual operation. The two diaphragm pistons are connected to each other by a key member which also serves to prevent an air valve from accidental returning.

5 Claims, 4 Drawing Figures

TANDEM BRAKE BOOSTER

BACKGROUND OF THE INVENTION

1. Field of the Invention

This invention relates to brake boosters for vehicles and more particularly to a tandem diaphragm brake booster of the type used in association with a vehicle brake system. In a vehicle brake system, the space for provision of a brake booster is severely restricted, especially in the radial direction of the vehicle body as compared to the longitudinal direction thereof. In order to save space in such radial direction, a tandem type diaphragm brake booster has been frequently used.

2. Description of the Prior Art

Conventionally, as is shown in U.S. Pat. No. 3,603,208, first and second diaphragms in such a tandem diaphragm booster arrangement are secured by bolts and nuts 50, 52. This connection is very difficult in manufacturing and necessitates the use of bolts and nuts, as indicated, which will of course increase the manufacturing cost. Further, a key member (not numbered, but appearing in FIG. 1 of the U.S. Patent) is disposed between two portions 38 and 40 of a hub 42 for preventing a valve means 76 from returning during valve operation.

SUMMARY OF THE INVENTION

According to the present invention, a key member is provided both for preventing a valve means from returning and for securing the two diaphragm sections, without using any further connecting means, and therefore being simple in design, inexpensive to manufacture and efficient in its operation.

BRIEF DESCRIPTION OF THE DRAWINGS

Various objects, features and attendant advantages of the present invention will be more fully appreciated as the same becomes better understood from the following detailed description when considered in connection with the accompanying drawings, wherein like reference numerals designate like or corresponding parts throughout the several views, and in which.

DETAILED DESCRIPTION OF THE PREFERRED EMBODIMENTS

Figures 1, 2:
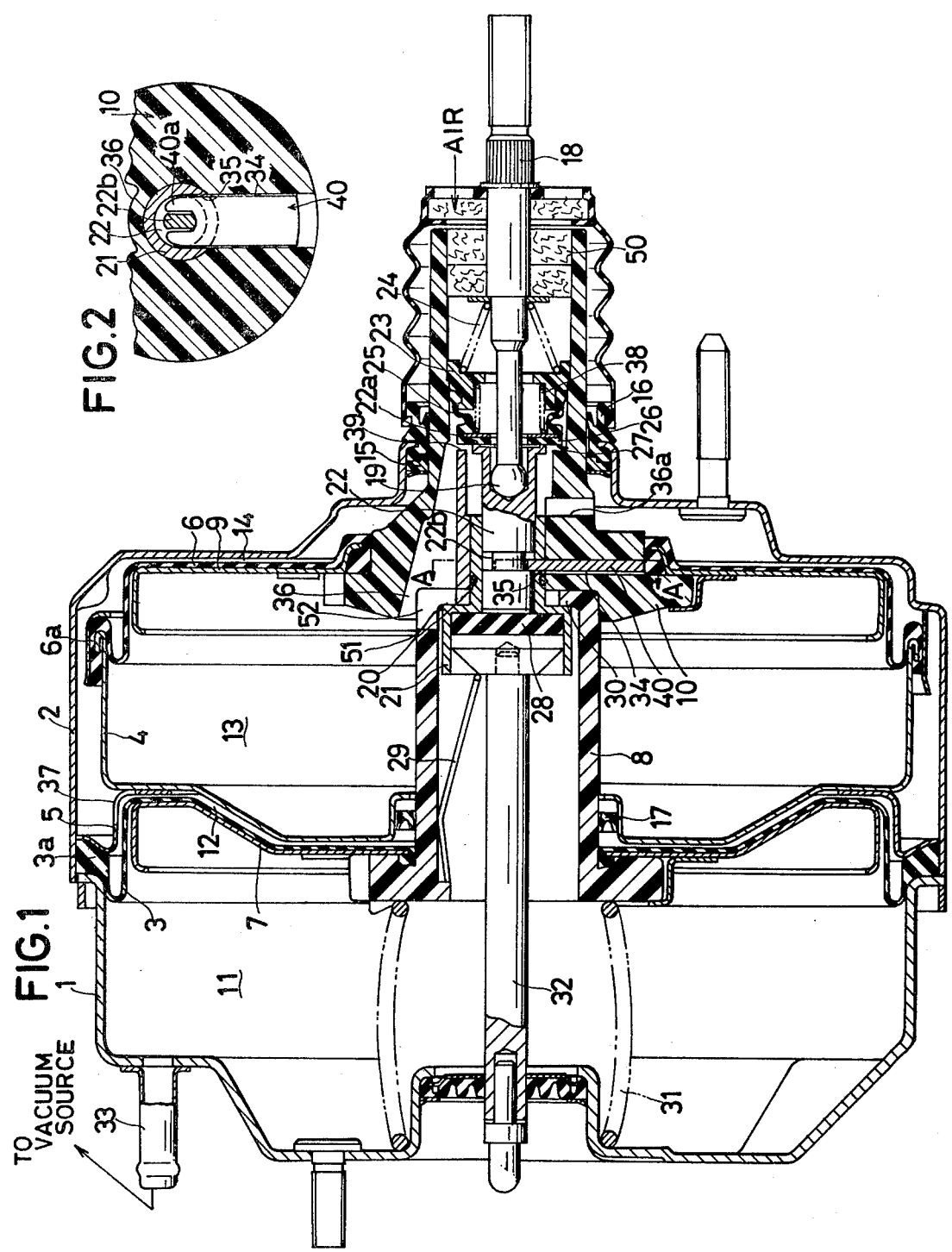
FIG. 1 is a cross-sectional view of a preferred embodiment of the present invention.
FIG. 2 is a fragmentary cross-sectional view taken along line A—A in FIG. 1.

Referring now to the drawings, there is shown in FIG. 1 a booster housing formed in two shell sections 1 and 2 that are joined together by a twist lock type connection. Section 1 is provided with a central opening that locates a seal while section 2 is provided with a similar central opening that locates a seal 16 which serves as a dust boot. A bead 3a of a first diaphragm 3 is compressed between a securing member 5 and a radial abutting portion of the shell section 1. Within the shell section 2 is provided a cup-shaped member 4 which is secured to the securing member 5. A bead 6a of a second diaphragm 6 is secured to the open end of the cup-shaped member 4. The first diaphragm 3 is secured to a first movable wall 7 and a first piston 8 at its inner periphery. Similarly, the second diaphragm 6 is secured to a second movable wall 9 and a second piston 10 at its inner periphery. Thus, the booster housing includes four chambers 11, 12, 13 and 14 therein. The first chamber 11 is provided between the inside wall of the shell section 1 and the first diaphragm 3 and is always connected to a vacuum source through port 33. The second chamber 12 is provided between the first diaphragm 3 and the cup-shaped member 4. The third chamber 13 is provided between the cup-shaped member 4 and the second diaphragm 6 and the fourth chamber 14 is provided between the second diaphragm 6 and the shell section 2. Numeral 15 designates a bearing member which slidably supports an outer periphery of the second piston 10. The seal 16 is also supported on the bearing 15 for air-tightly engaging with the outer periphery of the piston 10. A seal member 17 is provided between the cup-shaped member 4 and the outer periphery of the first piston 8 for providing a sealing function therebetween. A connecting rod 18, extending outwardly from the second piston 10, is operatively connected to a brake pedal or the like (not shown) for operating the booster upon axial movement thereof. The inner end of the rod 18 is provided with a ball head 19 operatively engaged with a plunger 22. A disk-like plate 23 is provided within the second piston 10 and is biased to the left by a spring 24. The disk-like plate 23 includes a seal member 25, the inner face 26 of which serves as a valve seat of an air valve 27. The valve seat 26 is in sealing contact with one end surface 22a of the plunger 22. Numeral 21 designates a case member which is disposed in a stepped bore of the first piston 8 and a bore of the second piston 10. The plunger 22 is disposed in a reduced diameter portion of the case member 21. A reaction member 28 made of an elastic material, such as rubber, is disposed in the large diameter portion of the case member 21. The case member 21 is biased to the right by a spring 29 so that an inwardly extending right end 30 of the first piston 8 may be supported between the large diameter portion of the case member 21 and the left end of the second piston 10. A spring 31 is disposed in the first chamber 11 for biasing the first piston 8 toward the second piston 10. A push rod 32 is connected at its one end to a not-shown master cylinder piston and at its other end to the case member 21. A passage 36 is provided in the second piston 10 for connecting the third chamber 13 with the fourth chamber 14, through a passage 36a and a gap 39 between the inside wall of the second piston 10 and the valve seat 26 of the air valve 27. The fourth chamber 14 is in fluid communication with the second chamber 12 through passage 37 provided on the securing member 5. The first and third chambers 11 and 13 are in fluid communication with each other through passages 51, 52 provided on the first piston 8. The case member 21 includes an undercut portion 35 in which a fork-type key 40 is disposed. The key 40 is also inserted into a recess 34 provided in the second piston 10. A fork portion 40a of the key 40 receives a reduced diameter portion 22b of the plunger 22, as is best shown in FIG. 2.

The reduced diameter portion 22b of the plunger 22 is designed to have a sufficient axial length so that the plunger 22 is axially movable for accomplishing the valve opening and closing operation. The fork portion 40a of the key member 40 restricts a further axial movement of the plunger 22 by abutting the shoulders of the large diameter portions of the plunger 22. The inwardly extending end 30 of the first piston 8 is retained between the case member 21 and the second piston 10 by the key member 40 which is inserted between the second piston 10 and the case member 21.

In operation, when the rod 18 is operated by the brake pedal to move to the left, the plunger 22 is then moved to the left. Simultaneously, the seal member 25 is moved to the left by the biasing force of a spring 38, maintaining the valve seat 26 of the seal member 25 in contact with the right end 22a of the plunger 22. This leftward movement of the seal member 25 is prevented when the valve seat 26 is engaged with the inner wall of the second piston 10 to interrupt communication between the third and fourth chambers 13 and 14.

Further leftward movement of the plunger 22 will release the engagement between the valve seat 26 and the right end 22a of the plunger 22 thereby to introduce air into the fourth chamber 14 from the open end of the second piston 10 through air filters 50 and passage 36a. The air introduced into the fourth chamber 14 is further introduced into the second chamber 12 through passage 37. Then the pressure differentials will prevail between the first and second chambers 11 and 12 and third and fourth chambers 13 and 14, respectively. Therefore, the first and second pistons 8 and 10 secured to the respective first and second diaphragms 3, 6 initiate movement to the left due to such pressure differentials. The case 21, which is keyed to the second piston 10, is also moved to the left to move the push rod 32 of the master cylinder, thereby to cause the master cylinder to generate brake pressure for brake operation. Reaction pressure to the rod 32 will deform the elastic reaction member 28 to abut plunger 22, providing a reaction which opposes the valve opening movement of the rod 18. After a desired braking effort is achieved, forward (leftward) movement of the rod 18 is stopped, following which the right end of the plunger 22 engages with the valve seat 26, thereby preventing further air flow into the fourth chamber 14.

When it is desired to reduce the force generated by the booster, the force applied to the rod 18 is reduced, whereupon the reaction member 28 and spring 24 cause the plunger 22 to bias the seal member 26 out of engagement with the inner side wall of the second piston 10 and so reduce the pressure in the fourth and second chambers 14, 12, and complete removal of force of the rod 18 permits the valve parts 27 to assume the position shown in FIG. 1 to equalize the vacuum in all four chambers 11, 12, 13 and 14.

Figure 3:
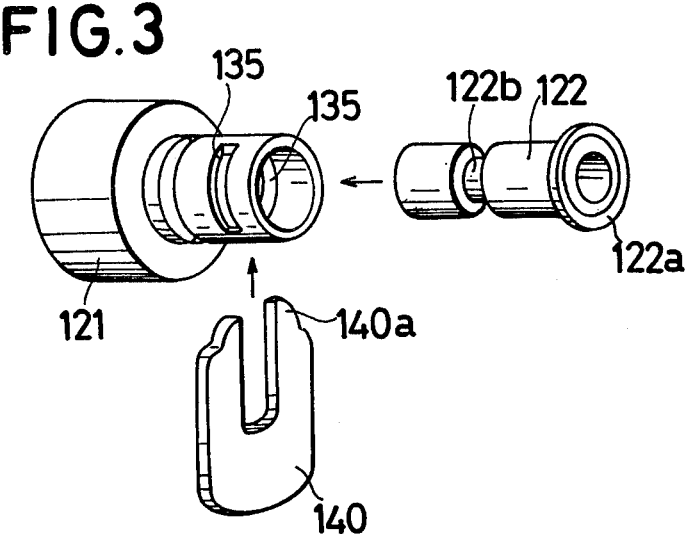
FIG. 3 is a perspective view of several parts of another embodiment of the present invention, shown in a disassembled condition.
Figure 4:
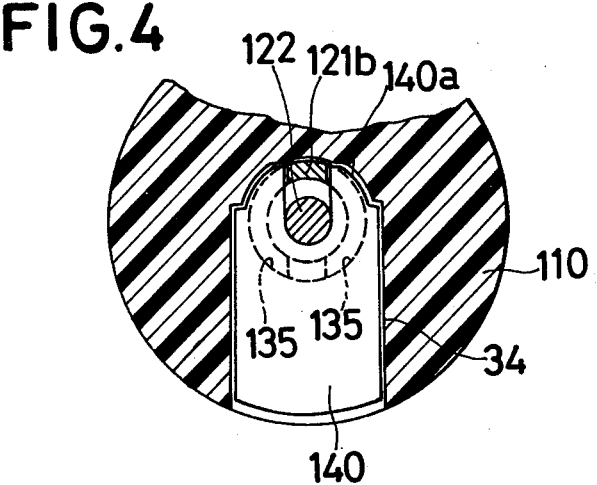
FIG. 4 is a view similar to FIG. 2, but showing the embodiment of FIG. 3.

In FIGS. 3 and 4, another embodiment of the present invention is shown. A key member 140 has a bifurcated or fork portion 140a extending upwardly to approximately an outer periphery of the reduced diameter portion of the case member 121, which has a pair of side slots 135 for receiving therein the fork portion 140a. A plunger 122 has a reduced diameter portion 122b which receives each inside wall of the fork portion 140a. The axil movement of the plunger 122 is thus limited by the key member 140.

Obviously many modifications and variations of this invention are possible in light of the teachings herein. It is therefore to be understood that within the scope of the appended claims, the present invention may be practiced otherwise than as specifically described herein.

What is claimed as new and desired to be secured by Letters Patent of the United States is:

1. A tandem diaphragm brake booster comprising:
    a housing;
    first and second diaphragms disposed in said housing in spaced relation to each other;
    a partition wall disposed between said first and second diaphragms within said housing for defining first, second, third and fourth chambers within said housing;
    a first piston means secured to said first diaphragm and axially slidable therewith;
    a second piston means secured to said second diaphragm and axially slidable therewith;
    first fluid passage means provided in said first piston means for fluid communication between said first and third chambers, said first chamber being in communication with a vacuum source;
    second fluid passage means provided in said partition wall for fluid communication between said second and fourth chambers;
    third fluid passage means provided in said second piston means for fluid communication between said third and fourth chambers;
    valve means disposed in said third fluid passage means for preventing fluid communication between said third and fourth chambers and introducing atmospheric pressure into said fourth chamber, thereby creating pressure differentials between said first and second chambers and said third and fourth chambers, respectively;
    an operator-operated means for actuating said valve means in response to manual operation;
    said valve means including a plunger operatively engaged with said operator-operated means and axially movable within said piston means;
    a case member disposed in said first and second pistons and receiving therein said plunger; and
    a key member disposed in said second piston means and extending to said plunger and said case member, thereby to retain said case member to said second piston means, one end of said first piston means being disposed between said case member and said second piston means, thereby connecting said two piston means by said key member.

2. The tandem diaphragm brake booster of claim 1 wherein said one end of said first piston means extends radially inwardly to be disposed between said case member and said second piston means.

3. The tandem diaphragm brake booster of claim 2 wherein said key member has a fork shaped portion which extends into a reduced diameter portion of said plunger for preventing rotation thereof.

4. The tandem diaphragm brake booster of claim 3 wherein one end of said plunger is operatively connected to said operator-operated means and the other end of which is operatively connected to an output means.

5. The tandem diaphragm brake booster of claim 4 wherein an elastic reaction member is disposed between said plunger and said output means for transmitting a reaction pressure to said operator-operated means.

* * * * *